US006990936B2

(12) United States Patent
Arai et al.

(10) Patent No.: US 6,990,936 B2
(45) Date of Patent: *Jan. 31, 2006

(54) SYSTEM AND METHOD FOR CONTROLLING INTAKE AIR BY VARIABLE VALVE TIMING

(75) Inventors: Masahiro Arai, Yokohama (JP); Hatsuo Nagaishi, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 54 days.

This patent is subject to a terminal disclaimer.

(21) Appl. No.: 09/727,554

(22) Filed: Dec. 4, 2000

(65) Prior Publication Data
US 2001/0037780 A1    Nov. 8, 2001

(30) Foreign Application Priority Data
Dec. 3, 1999   (JP) .................................. 11-345374

(51) Int. Cl.
F01L 1/34      (2006.01)
(52) U.S. Cl. ................. 123/90.15; 123/90.11; 123/90.12; 123/347; 701/103
(58) Field of Classification Search .... 123/90.1–90.67, 123/347, 348, 399; 701/103, 110, 115
See application file for complete search history.

(56) References Cited

U.S. PATENT DOCUMENTS

| | | | | |
|---|---|---|---|---|
| 4,033,304 A | * | 7/1977 | Luria | 123/316 |
| 4,084,557 A | * | 4/1978 | Luria | 123/90.15 |
| 4,357,917 A | * | 11/1982 | Aoyama | 123/90.16 |
| 4,633,403 A | * | 12/1986 | Asmus | 701/105 |
| 4,700,684 A | * | 10/1987 | Pischinger | 123/568 |
| 4,878,461 A | * | 11/1989 | Sapienza et al. | 123/90.15 |
| 4,917,058 A | * | 4/1990 | Nelson et al. | 123/90.17 |
| 5,031,582 A | * | 7/1991 | Kruger | 129/90.15 |
| 5,080,055 A | * | 1/1992 | Komatsu et al. | 123/90.17 |
| 5,140,953 A | * | 8/1992 | Fogelberg | 123/58 A |
| 5,161,497 A | * | 11/1992 | Simko et al. | 123/90.15 |
| 5,222,465 A | * | 6/1993 | Sakamoto et al. | 123/90.15 |
| 5,224,460 A | * | 7/1993 | Havstad | 123/568 |
| 5,233,948 A | * | 8/1993 | Boggs et al. | 123/432 |
| 5,284,116 A | * | 2/1994 | Richeson | 123/425 |
| 5,377,631 A | | 1/1995 | Schechter | |
| 5,590,632 A | * | 1/1997 | Kato et al. | 123/480 |
| 5,785,016 A | | 7/1998 | Enderle et al. | 123/90.11 |
| 5,996,560 A | * | 12/1999 | Schechter | 123/348 |

(Continued)

FOREIGN PATENT DOCUMENTS

DE    198 10 298 A1    9/1998

(Continued)

OTHER PUBLICATIONS

U.S. Appl. No. 09/299,098, filed Apr. 25, 1999, Nagaishi et al.

(Continued)

Primary Examiner—Thomas Denion
Assistant Examiner—Jaime Corrigan
(74) Attorney, Agent, or Firm—Foley & Lardner LLP

(57) ABSTRACT

A system and method control intake air of an internal combustion engine. The engine has at least one combustion chamber provided with intake valves together with an intake manifold provided with a throttle valve. The opening and closure timings of the intake valves are adjustable entirely independently by electromagnetic drivers from the crankshaft position to control the amount of intake air supplied to the combustion chamber. The system and method provide a response adjustment to variable valve timing control of the intake valves for unthrottled intake air control.

10 Claims, 9 Drawing Sheets

U.S. PATENT DOCUMENTS

| | | | |
|---|---|---|---|
| 6,000,375 A | 12/1999 | Isobe | |
| 6,161,521 A * | 12/2000 | Russ et al. | 123/324 |
| 6,182,636 B1 * | 2/2001 | Russell et al. | 123/399 |
| 6,189,512 B1 * | 2/2001 | Kawasaki | 123/479 |
| 6,286,478 B1 * | 9/2001 | Atago | 123/306 |
| 6,363,316 B1 | 3/2002 | Soliman et al. | |
| 6,397,814 B1 | 6/2002 | Nagaishi et al. | |
| 6,405,706 B1 * | 6/2002 | Hammoud et al. | 123/316 |
| 6,502,543 B1 * | 1/2003 | Arai et al. | 123/348 |
| 2001/0032613 A1 | 10/2001 | Arai et al. | |

FOREIGN PATENT DOCUMENTS

| | | |
|---|---|---|
| EP | 0 953 750 | 11/1999 |
| EP | 0 953 750 A2 | 11/1999 |
| EP | 1 063 393 A2 | 12/2000 |
| EP | 1 063 407 A1 | 12/2000 |
| JP | 8-200025 | 8/1996 |
| JP | 8-284737 A | 10/1996 |
| JP | 11-002140 A | 1/1999 |
| JP | 11-117777 A | 4/1999 |
| JP | 11-311135 A | 11/1999 |
| WO | WO 99/47800 A1 | 9/1999 |

OTHER PUBLICATIONS

U.S. Appl. No. 09/686,992, filed Oct. 11, 2000, Arai et al.
U.S. Appl. No. 09/727,789, filed Dec. 4, 2000, Arai et al.
U.S. Appl. No. 09/727,787, filed Dec. 4, 2000, Kawasaki et al.
Toshio, "Output Controller for Internal Combustion Engine," Patent Abstracts of Japan, vol. 1999, No. 062, Feb. 26, 1999, JP 10-311231, Nov. 24, 1998, 1 Sheet, Abstract.
Takashi, "Solenoid Valve Controller," Patent Abstract of Japan, vol. 1996, No. 12, Dec. 26, 1996, JP 08-200025, Aug. 6, 1996, 1 Sheet, Abstract.
Osamu, "Output Controller for Internal Combustion Engine," Patent Abstracts of Japan, vol. 1997, No. 10, Oct. 31, 1997, JP 09-170462, Jun. 30, 1997, 1 Sheet, Abstract.
Patent Abstracts of Japan, vol. 004, No. 132, Sep. 17, 1980 & JP 55-087834 (Nissan Motor Co., Ltd.), Jul. 3, 1980, Abstract.

* cited by examiner

SYSTEM AND METHOD FOR CONTROLLING INTAKE AIR BY VARIABLE VALVE TIMING

BACKGROUND OF THE INVENTION

1. Field of the Invention

The present invention relates to a system and method for controlling intake air to an internal combustion engine by variable valve timing.

2. Terminology

Engine Displacement

This is used herein to mean the sum of displacements of all of cylinders of an engine. "Engine displacement" and "displacement of an engine" are synonyms. In the description, the reference character "VOL#" is used to represent the "engine displacement".

3. Description of Related Art

JP-A 8-200025 discloses a system for controlling electromagnetic drivers (EMDs) for intake and exhaust valves provided per each combustion chamber of an internal combustion engine. According to this system, an electronic control unit (ECU) controls valve timings of intake and exhaust valves independently from the crankshaft position and speed in one of predetermined schedules fit for various engine operation ranges. The ECU identifies which one of the various engine operation ranges against varying engine load and engine speed. During transient period from one to another of the engine operation ranges, the ECU shifts the valve timings of intake valves in a gradual manner so as to prevent occurrence of a rapid change in intake air characteristic. This JP-A is silent as to how engine load is controlled and has no teaching with regard to engine load control by early or delayed valve closure timings of the intake valves.

The present invention aims at controlling intake air by varying valve closure timings of intake valves using such EMDs. The electromagnetic drivers can adjust the valve opening and closure timings over a wide range independently from the crankshaft position. Since throttling of intake air is not relied upon to control the engine load, the engine pumping losses are eliminated.

Because of the provision of an intake manifold and an intake collector downstream of a throttle valve, there is a delay, during throttled intake air control, between a change in angular position of the throttle valve and a change in cylinder air charge caused by the change in throttle angular position. In the case of unthrottled intake air control, there is no delay caused due to the intake manifold and intake collector so that a change in valve closure timing induces a change in cylinder air charge without any delay, providing aggressive response performance. Thus, operator aggressive cyclic depression and release of accelerator pedal induces violent torque change imparted to a power train induces vibration, providing a reduction in ride comfort and elevated noise level.

Unthrottling intake air control is satisfactory. However, it cannot control cylinder air charge satisfactorily in a certain operation range. In such operation range, throttling of intake air by a throttle valve is needed. In such case, care must be taken to provide a smooth transition during the transient period from the unthrottled control to the throttled control or vice versa without any shock due to a torque change. Undesired torque change might take place during such transient period due mainly to a considerable difference in response performance between the two controls.

Thus, a need remains to improve an unthrottled intake air control by variable valve timing such that the occurrence of violent torque variation caused by aggressive cyclic depression and release manipulation of an accelerator pedal is prevented and the undesired torque change during transient period from one to the other of the two intake air controls is suppressed.

SUMMARY OF THE INVENTION

It is an object of the present invention to provide a system and method for controlling intake air to an internal combustion engine such that the occurrence of violent torque variation caused by aggressive cyclic depression and release manipulation of an accelerator pedal is prevented and the undesired torque change during transient period from one to the other of the two intake air controls is suppressed.

According to one aspect of the present invention there is provided a method for controlling intake air of an internal combustion engine, the engine having at least one combustion chamber provided with intake means together with an intake manifold provided with a throttle valve, wherein the opening and closure timings of the intake means are adjustable entirely independently from the crankshaft position to control the amount of intake air supplied to the combustion chamber, the method comprising:

providing a response adjustment to variable valve timing control of the intake means for unthrottled intake air control.

According to another aspect of the present invention, there is provided a system for controlling intake air of an internal combustion engine, the engine having at least one combustion chamber provided with intake means together with an intake manifold provided with a throttle valve, wherein the opening and closure timings of the intake means are adjustable entirely independently from the crankshaft position to control the amount of intake air supplied to the combustion chamber, the method comprising:

a control for a response adjustment to variable valve timing control of the intake means for unthrottled intake air control.

BEST MODES FOR CARRYING OUT THE INVENTION

Figure 1:
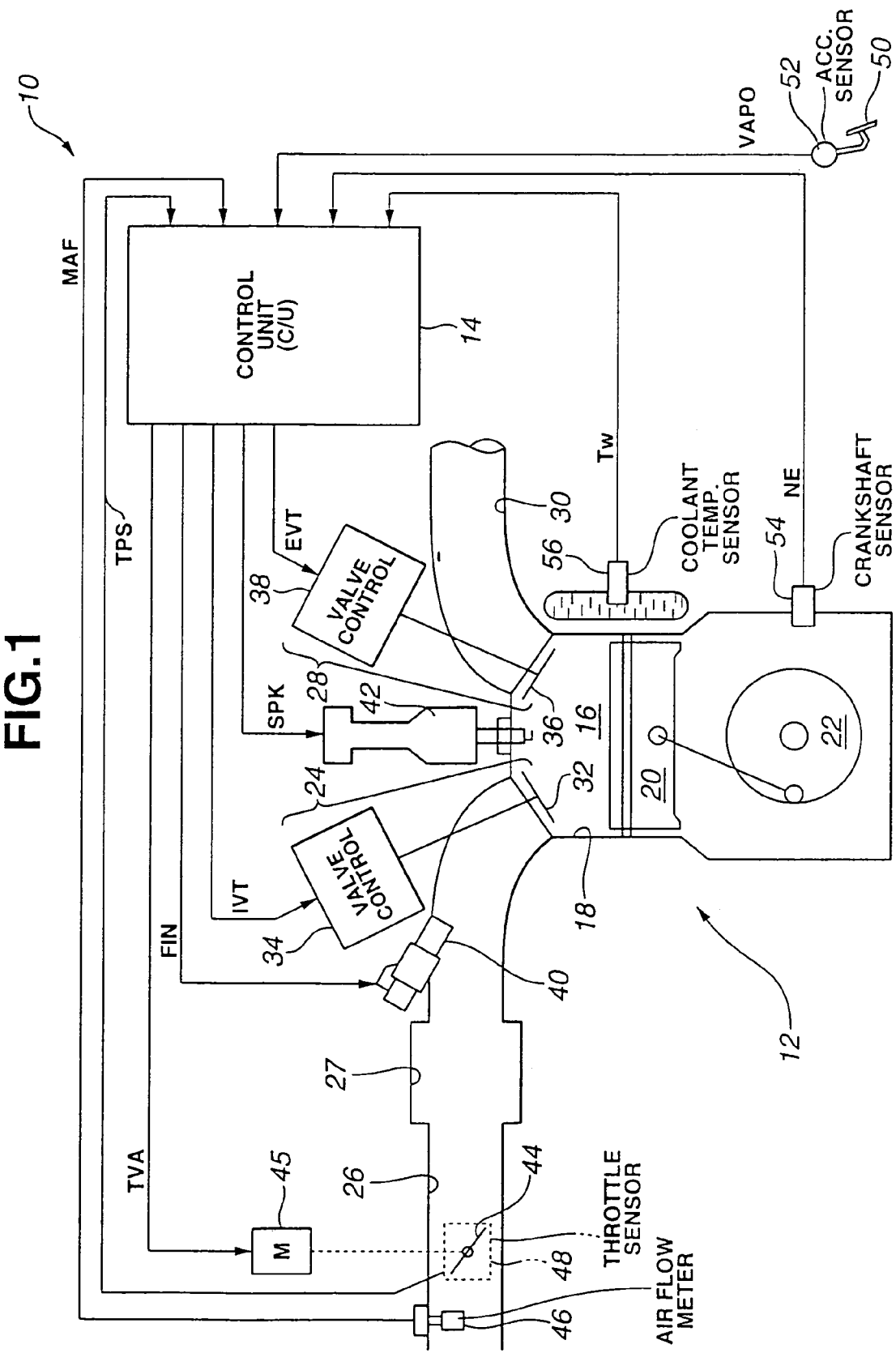
FIG. 1 is a block diagram illustrating a system and method for controlling intake air to an internal combustion engine according to the present invention.

FIG. 1 is a block diagram illustrating operation of a system or method for controlling intake air by variable intake valve timing with response performance adjustment according to the present invention. System 10 includes an internal combustion engine, indicated generally by reference numeral 12, in communication with a control unit (C/U) 14. As schematically shown in FIG. 1, engine 12 has at least one combustion chamber 16 defined within a cylinder 18 by a reciprocating piston 20 operatively connected to a crankshaft 22. Combustion chamber 16 is provided with intake means 24 together with an intake manifold 26, including a collector 27, and exhaust means 28 together with an exhaust manifold 30. Intake means 24 include at least one intake valve 32, each driven by a variable valve control 34. Exhaust means 28 include at least one exhaust valve 36, each driven by a variable valve control 38. Fuel is injected into combustion chamber 16 through an injection nozzle 40. A spark plug 42 produces a spark to initiate combustion of combustible charge within combustion chamber 16. A throttle valve 44 is provided to control air inflow to intake manifold 26.

Various sensors are provided to monitor engine operation conditions. Sensors may include an air flow meter 46, which provides a mass airflow (MAF) signal to C/U 14 to monitor the air intake into intake manifold 26. A throttle sensor 48 provides a throttle position sensor (TPS) signal to C/U 14 to monitor the throttle opening angle or position of throttle valve 44. An accelerator pedal 50 is used to determine the operator or driver torque request command. An accelerator sensor 52 provides a vehicle accelerator pedal opening (VAPO) or pedal position signal indicative of the accelerator pedal opening angle or position of accelerator pedal 50.

Engine 12 includes various other sensors such as a crankshaft sensor or engine speed sensor 54, which provides a signal indicative of engine speed (NE) to C/U 14, and an engine coolant temperature sensor 56. Engine coolant temperature sensor 56 provides an engine coolant temperature (Tw) signal indicative of the engine coolant temperature to C/U 14.

Figure 2:
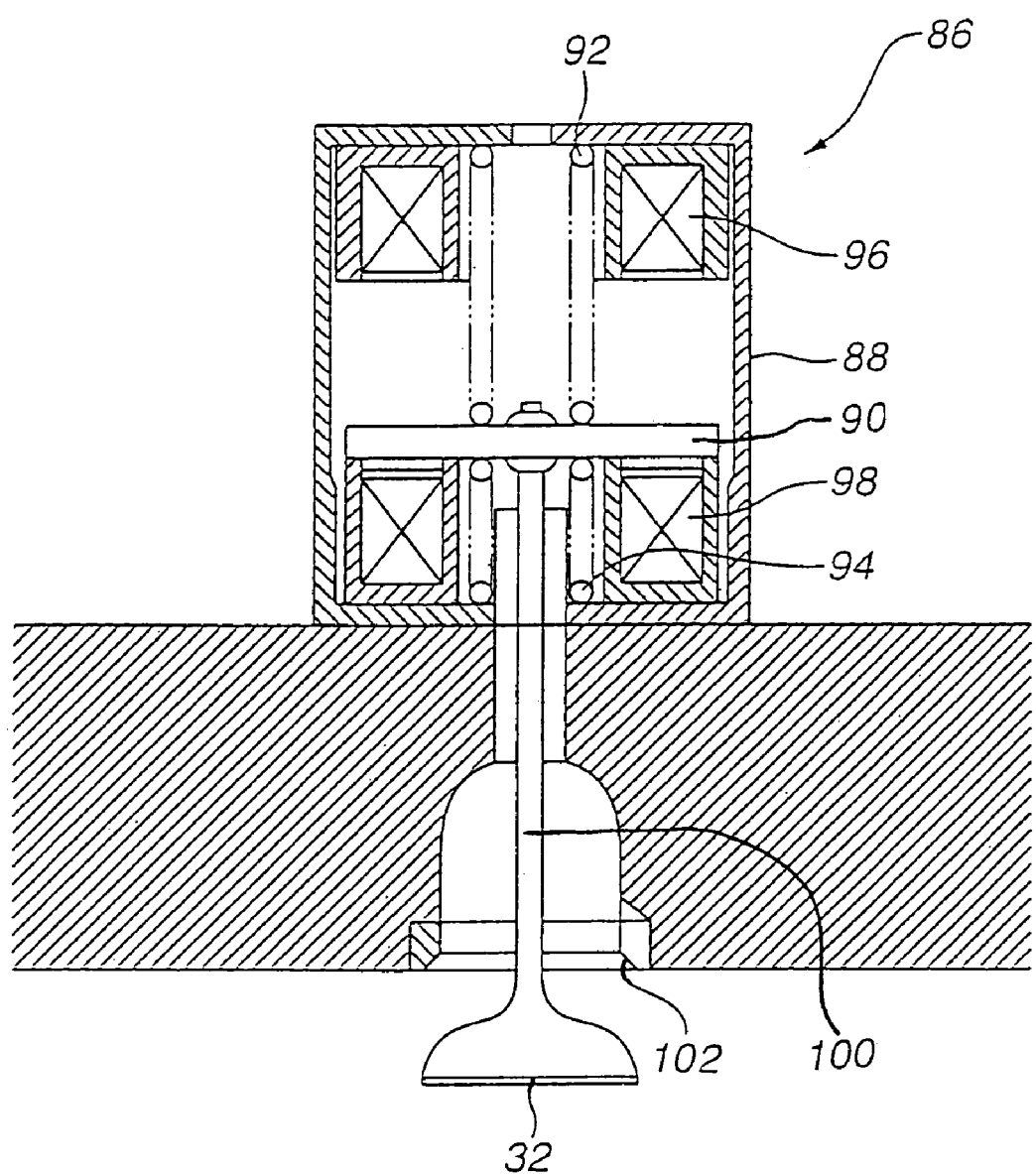
FIG. 2 is a schematic view of an electromagnetic driver (EMD) used in each of valve controls for intake and exhaust valves of the engine.

FIG. 2 provides a schematic view of an EMD 86, which is used in each of valve controls 34 and 38, for the associated cylinder valve, for example, intake valve 32. EMD 86 includes a housing 88, a movable plate 90 is kept in a neutral position, as illustrated in FIG. 2, within housing 88 by means of two springs 92 and 94. Springs 92 and 94 are arranged on one and the opposite sides of movable plate 90. At the remotest ends, springs 92 and 94 bear against housing 88. At the nearest ends, springs 92 and 94 bear against spaced walls of movable plate 90. Two electromagnetic coils 96 and 98 are mounted to housing 88 on one and the opposite sides of movable plate 90. With no supply of electric current through electromagnetic coil 98, supply of electric current through electromagnetic coil 96 attracts movable plate 90 for movement against the action of spring 92. Supply of electric current through electromagnetic coil 98 with no supply of electric current through electromagnetic coil 96 attracts movable plate 90 for movement against the action of spring 94. In order to transmit at least movement of movable plate 90 in a direction against spring 94 to intake valve 32, the valve stem is operatively connected to movable plate 90. Thus, with no supply of electric current through electromagnetic coil 96, supply of electromagnetic coil 98 can hold intake valve 32 lifted from a rest position where intake valve 32 rests on a valve seat 102. In this embodiment, valve stem 100 is fixed to movable plate 90 so that supply of electric current through electromagnetic coil 96 with interruption of supply of electric current through electromagnetic coil 98 can hold intake valve 32 to the rest position.

Figure 3:
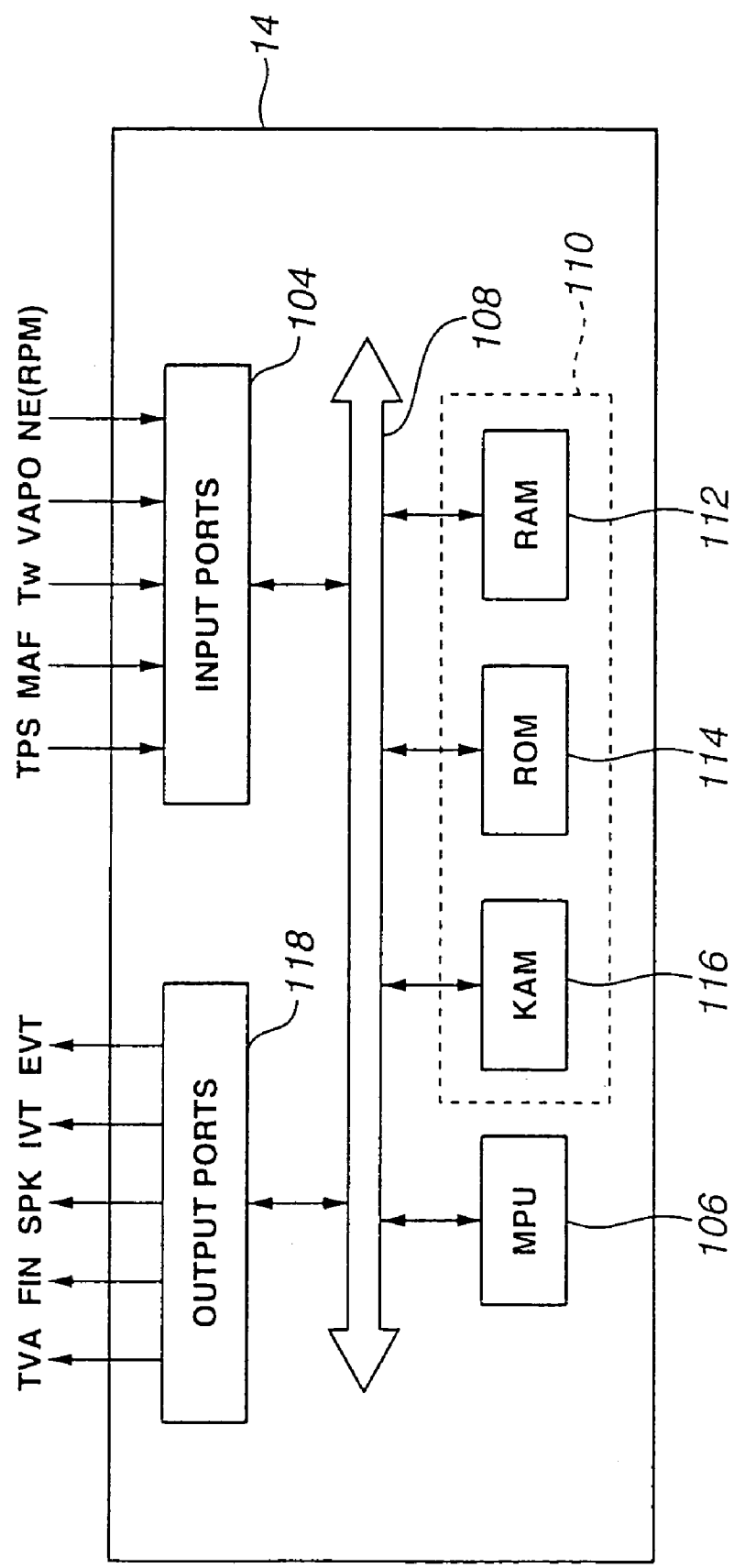
FIG. 3 is a bock diagram of a control unit implementing the present invention.

Referring to FIG. 3, C/U 14 receives signals from the various sensors via input ports 104, which may provide signal conditioning, conversion, and/or fault detection as well known in the art. Input ports 104 communicate with processor (MPU) 106 via a data/control bus 108. MPU 106 implements control logic in the form of hardware and/or software instructions, which may be stored in a computer-readable media 110 to effect intake air control for engine 12. Computer-readable media 110 may include various types of volatile and nonvolatile memory such as random-access memory (RAM) 112, read-only memory (ROM) 114, and keep-alive memory (KAM) 116. These functional classifications of memory may be implemented by one or more different physical devices such as PROMs, EPROMs, EEPROMs, flash memory, and the like, depending upon the particular application.

MPU 106 communicates with various actuators of engine 12 via output ports 118. Actuators may control ignition timing or spark SPK, timing and metering of fuel FIN, position of throttle valve TVA to control air inflow, intake valve timing (IVT) to control intake air into the combustion chamber and exhaust valve timing (EVT). In the operation range where throttled intake air control is required, the position of throttle valve 44 is variably adjusted by an actuator in the form of a motor 45 to control intake air into combustion chamber 16 and intake valve closure (IVC) timing is adjusted by EMD 86 to provide a valve opening duration in the neighborhood of the least duration. In the operation range where unthrottled intake air control is required, IVC control is performed and the position of throttle valve 44 is adjusted so as to maintain boost pressure within the intake manifold at a target negative pressure value. In IVC control, intake valve closure (IVC) timing is variably adjusted to control intake air into the combustion chamber 16 without relying on throttling of airflow by throttle valve 44.

Figure 5:
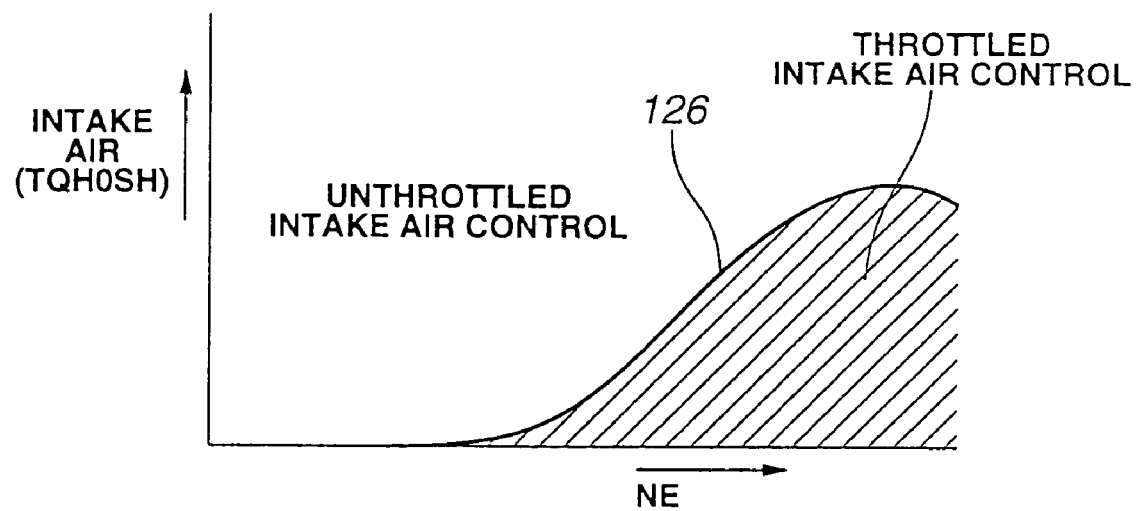
FIG. 5 is a graph illustrating intake air control schedule.

FIG. 5 illustrates, by a shadowed area, low-load high-speed operation range where throttled intake air control is to be performed. An area not shadowed in FIG. 5 illustrates operation range where throttled intake air control is to be performed.

In the low-load high-speed operation range, it is impossible to accomplish a target intake air by early valve closure timing because the minimum valve opening duration is determined independently of the crankshaft position and speed by EMD 86.

With the minimum valve opening duration having the earliest valve closure timing, increasing the crankshaft speed results in a delay in valve closure timing in terms of crankshaft angular position. Thus, in the low-load high-speed operation range as indicated by the shadowed area in FIG. 5, it is impossible to accomplish the target intake air by early intake valve closure with the wide open throttle (WOT).

In a preferred embodiment, in operation range not shadowed in FIG. 5, unthrottled intake air control is performed to accomplish a target value by variably adjusting IVC timing with boost pressure within intake manifold 26 maintained constant by variably adjusting throttle valve 44. In low-load high-speed operation range as indicated by shadowed area in FIG. 5, throttled intake air control is performed to accomplish a target value by variably adjusting throttle position of throttle valve 44 to vary the boost pressure with the IVC timing adjusted in the neighborhood of the minimum valve opening duration.

In the preferred embodiment, MPU 106 executes instructions stored in computer-readable media 110 to carry out a method for intake air control to communicate with the EMD 34 for intake valve 32 and the motor 45 for throttle valve 44 for unthrottled intake air control in coordination with throttled intake air control.

Figure 4:
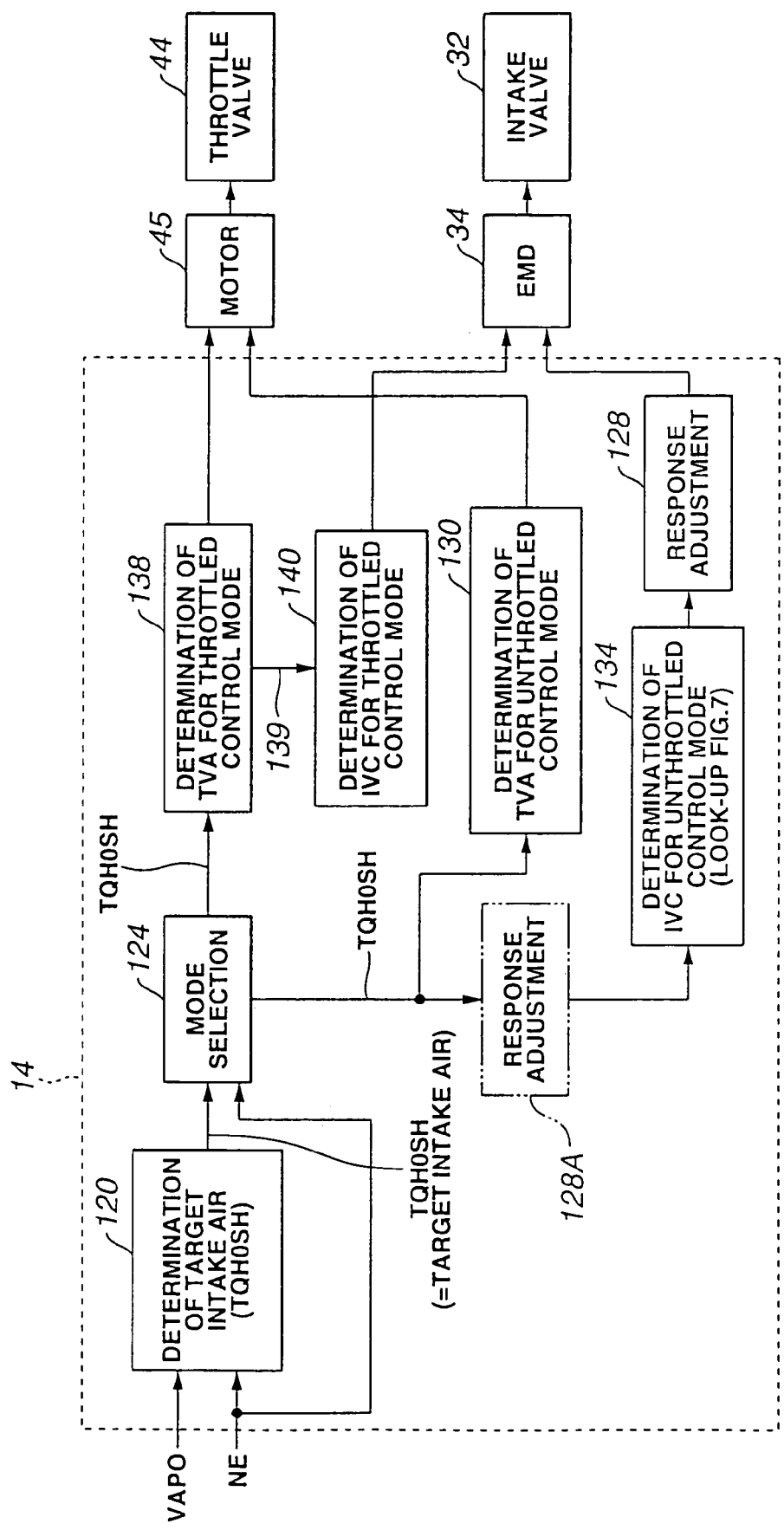
FIG. 4 is a control diagram of controls according to the present invention.

FIG. 4 provides a block diagram illustrating representative controllers for intake air control to provide engine torque control.

Figure 6:
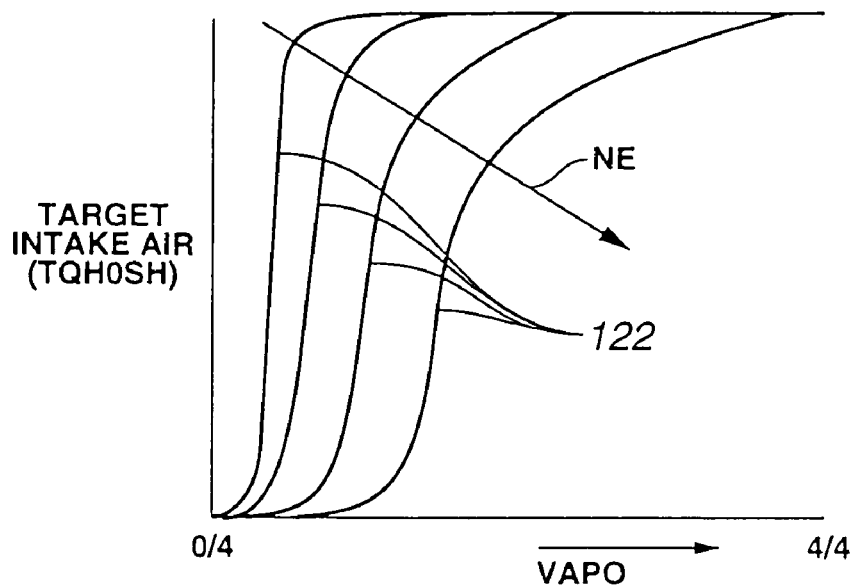
FIG. 6 is a graphical representation of retrievable mapped data of various values of target airflow rate against varying values of accelerator angular position (VAPO) with varying values of engine speed (NE) as parameter.

In the preferred embodiment, C/U 14 implements determination of a target intake air (TQH0SH) at a block 120 based on operator torque request command derived from accelerator position VAPO and engine speed NE. A group of curves 122 in FIG. 6 illustrate how target intake air TQH0SH varies against variation of VAPO at each of different values of engine speed NE. One representative example of determination of TQH0SH is disclosed in United States Patent Application Serial No. Unassigned yet, filed on Dec. 4, 2000, entitled "Unthrottled intake air control with partial delay for requested engine response performance," which has been commonly assigned herewith and claims the priority of Japanese Patent Applications Nos. 11-343910 (filed Dec. 2, 1999), 11-345375 (filed Dec. 3, 1999), 11-345374 (filed Dec. 3, 1999), and 11-356401 (filed Dec. 15, 1999). The disclosure of this commonly assigned pending United States Patent Application has been hereby incorporated by reference in its entirety to clarify one example of processing, which may be performed at block 120. Another example of processing, which may be performed at block 120, is a table look-up operation of retrievable mapped data as illustrated in FIG. 6, stored in ROM 114, against various combination of values of VAPO and NE to determine a target value of TQH0SH. In this case, an intake air amount need for idle speed control (IDS) should be added to the target value obtained by the table look-up operation.

Block 120 provides its output TQH0SH to a block 124. Block 124 inputs NE as well as TQH0SH and performs control mode selection. Block 124 compares the input value of TQH0SH with a threshold value on a curve 126 defining the boundary of the part-load high-speed operation range illustrated by the shadowed area in FIG. 5. For obtaining the threshold value on curve 126, a table look-up operation of mapped data of values in intake air on curve 126 against the input value of NE. The mapped data of threshold values is stored in ROM 114. In block 124, unthrottled intake air control is selected if TGH0SH holds a predetermined relation with threshold value 126. The predetermined relation involves TGH0SH greater than threshold value 126. Block 124 selects throttled intake air control if TGH0SH fails to hold the predetermined relationship. For example, throttled intake air control is selected when TGH0SH is less than threshold value 126.

Assuming now that unthrottled intake air control is selected, block 124 provides TQH0SH to a block 130 for determination of TVA for unthrottled intake air control and also to a block 134 for determination of IVC for unthrottled intake air control.

For determination of TVA for throttled intake air control in block 130, MPU 106 determines a target throttle position TVA in the neighborhood of wide open throttle (WOT) position so that inflow of air to intake manifold 26 is held unthrottled.

Figure 7:
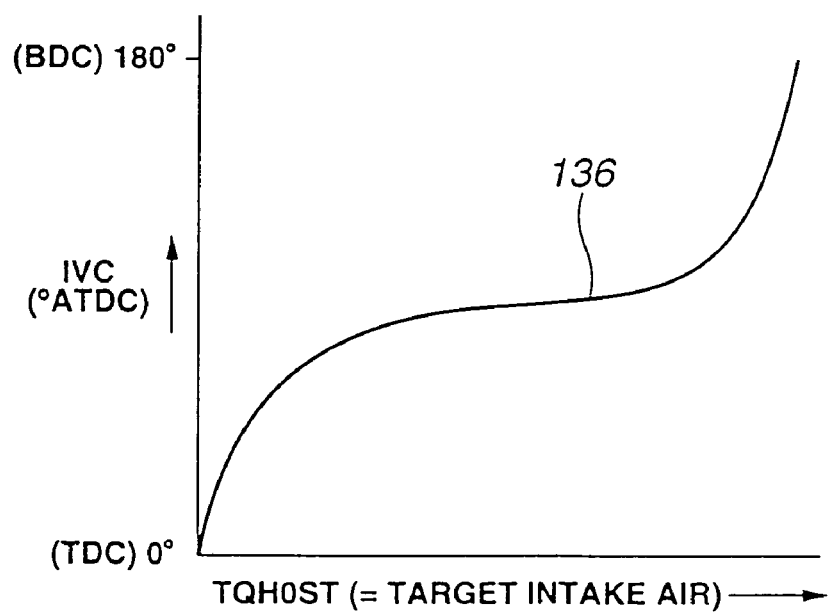
FIG. 7 is a graphical representation of retrievable mapped date of values of intake valve closure (IVC) timing of intake means against varying values of target airflow rate.
Figure 8:
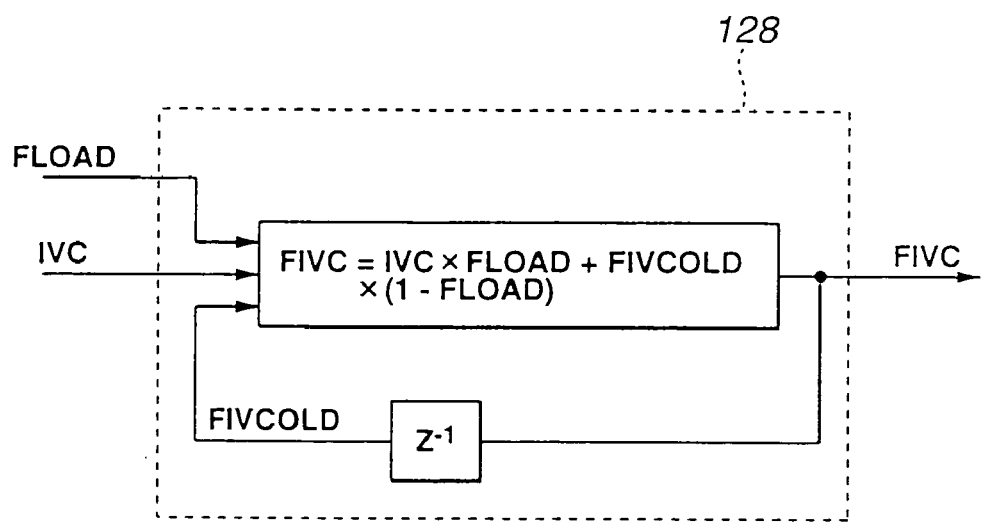
FIG. 8 is a mathematical representation of a response adjuster used in FIG. 4.
Figure 9:
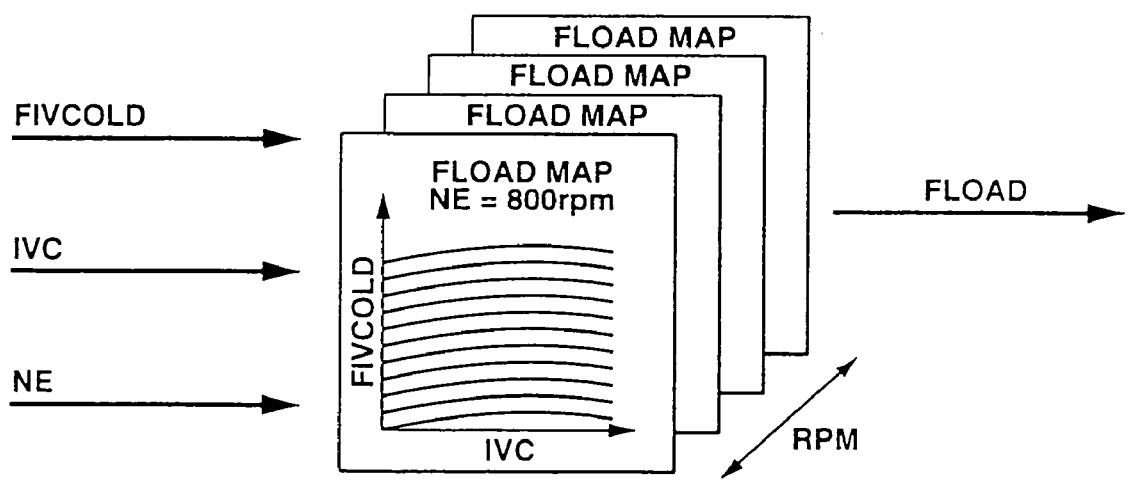
FIG. 9 is a schematic representation of retrievable mapped data of response correction coefficient represented by the reference character FLOAD.

For determination of IVC for throttled intake air control in block 134, MPU 106 determines IVC timing by performing a table look-up operation of mapped retrievable values on a curve 136 shown in FIG. 7 against the input value of FQH0SH. Block 134 provides determined IVC to a response adjustment block 128. FIG. 8 provides a mathematical representation of processing performed at block 128 using IVC and response correction coefficient FLOAD. Values of FLOAD are determined based on data obtained by various experiments or tests or by computer simulations to provide an appropriate delay equivalent to the time constant caused by the volume of the intake manifold 26 downstream of throttle valve 44. FIG. 9 illustrates structure of retrievable data of values of FLOAD including a number of two-dimensional maps, called FLOAD maps, prepared against representative values of engine speed NE (RPM). Against the input value of NE, two maps are selected for table look-up operations against the current input value of IVC and the preceding or old value of the processed or final target intake valve closure timing FIVCOLD to provide two retrieved values. Using these two retrieved values, an interpolation is made to an appropriate value of FLOAD against the current value of NE. In the illustration, only one set of FLOAD maps are used to provide FLOAD. Preferably, different sets of FLOAD maps should be provided and used for acceleration and deceleration, respectively.

As illustrated in FIG. 18, using as inputs IVC and FLOAD, block 128 generates, as an output, FIVC by calculating the following equation:

$$FIVC = IVC \times FLOAD + FIVCOLD \times (1 - FLOAD) \qquad (1).$$

where: FIVCOLD is an old or preceding value of FIVC.

Block 128 provides FIVC to a control loop for EMD 34. The control loop determines a control signal in response to FIVC and provides the control signal to EMD 34 for closing intake valve 32 at the closure timing as indicated by determined IVC timing.

In the preferred embodiment, the valve opening and valve closure timings of intake valve 32 for throttled intake air control are such that the valve opening timing is held at a crankshaft position near the top dead center (TDC) and the valve closure timing is variably shifted to a crankshaft position falling within a range between the crankshaft position of the valve opening timing and the bottom dead center (BDC).

Let us now assume that throttled intake air control mode is selected in block 124. In this case, block 124 provides TQH0SH to block 138 for determination of TVA for throttled intake air control mode. Concurrently with the selection of throttled intake air control mode, a block 140 for determination of IVC for throttled intake air control mode is triggered to put into operation in response to a signal as indicated by an arrow 139.

For determination of TVA for throttled intake air control in block 138, MPU 106 determines area ATH against TQHOSH and NE. Then, MPU 106 conducts conversion of the determined area $A_{TH}$ to a target throttle position TVA by performing a look-up operation of a table against $A_{TH}$. Block 138 provides TVA to motor 45 for throttle valve 44.

For determination of IVC for throttled intake air control in block 140, MPU 106 inputs NE and determines as a function of NE a target value of IVC timing to accomplish the minimum valve opening duration at the input value of NE. Block 140 determines a control signal in response to the determined IVC timing and provides control signal to EMD 34 for closing intake valve 32 at the closure timing as indicated by determined IVC timing.

Figure 10:
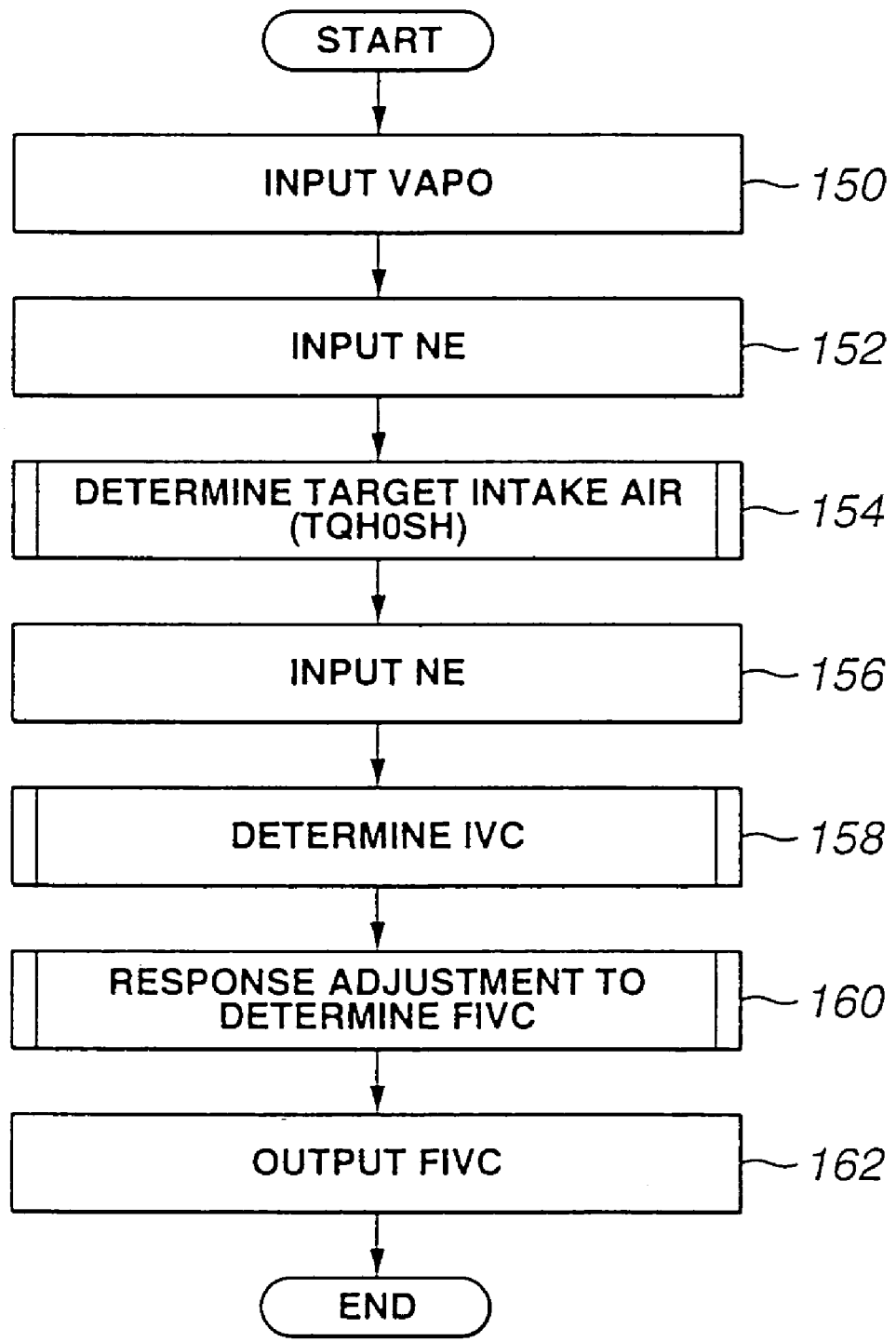
FIG. 10 is a flow chart illustrating control logic according to the present invention.

An example of how C/U 14 would implement the present invention can be understood with reference to FIG. 10. The flow chart of FIG. 10 illustrates control logic for providing intake valve closure timing for unthrottled intake air control according to the present invention. One of ordinary skilled in the art will recognize that the control logic may be implemented in software, hardware, or a combination of software and hardware. Likewise, various processing strategies may be utilized without departing from the spirit or scope of the present invention. The sequences of operations illustrated is not necessarily required to accomplish the advantages of the present invention, and provided for ease of illustration only. Likewise, various steps may be performed in parallel or by dedicated electric or electric circuits.

In FIG. 10, step 150 represents input of VAPO. Step 152 represents input of NE. Step 154 represents determination of TQH0SH. Step S156 represents input of NE. Step 158 represents determination of IVC for throttled intake air control. Step 160 represents response adjustment in the manner as described in connection with FIGS. 8 and 12 to give FIVC. Step 162 represents output of FIVC.

Figure 11A:
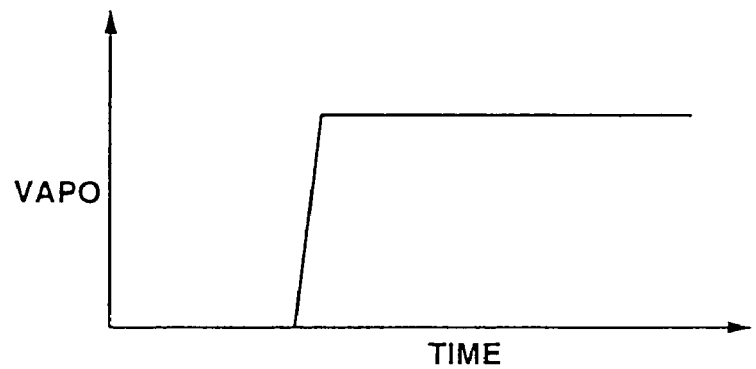
FIGS. 11A, 11B and 11C are graphical representations illustrating engine response performance with the benefit of the present invention as compared to engine response performance without the benefit of the present invention.
Figure 11B:
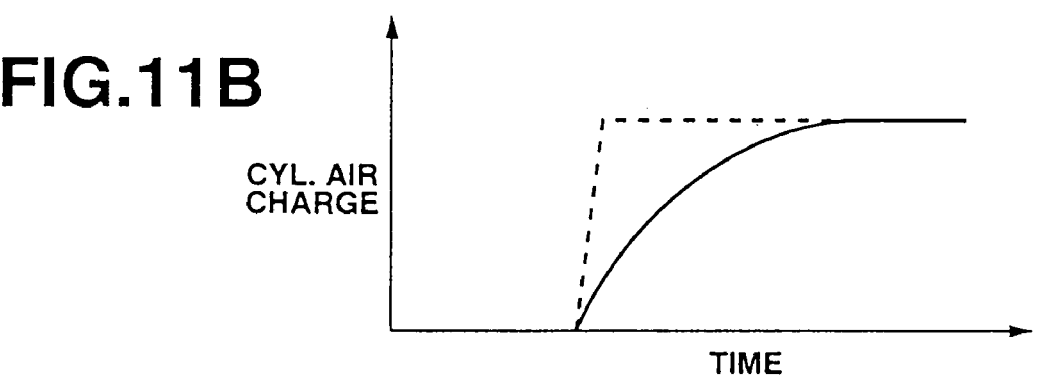
Figure 11C:
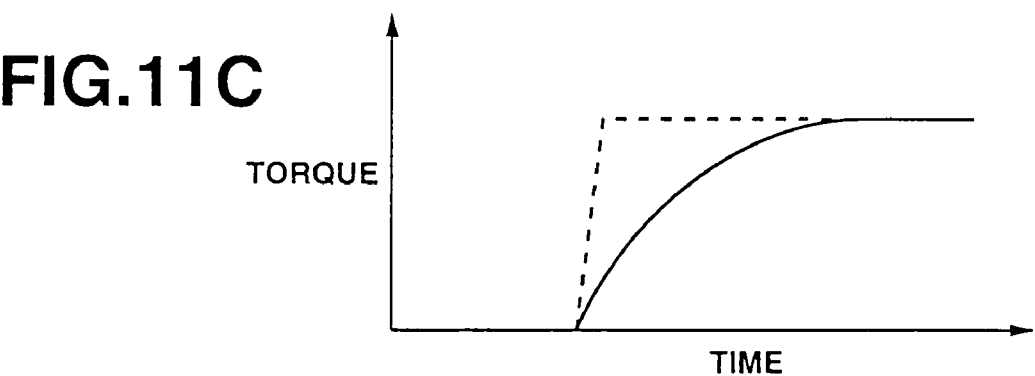

Referring to FIGS. 11A, 11B, and 11C, the fully drawn line in each of FIGS. 11B and 11C illustrates a smooth transient response characteristic with the benefit of the present invention to a step-like increase of VAPO as illustrated in FIG. 11A. The dotted line in each of FIGS. 11B and 11C illustrates a transient response characteristic without the benefit of the present invention.

In the preceding description, the response adjustment is made on the output IVC of block 134. If desired, a response adjustment may be made on the input TQH0SH of block 134. In this case, a block 128A for response adjustment is provided and give a final or processed value FQHOST by performing mathematical calculation that may be expressed as:

$$FQH0ST = (TQH0SH \times FLOAD + FQHOLD \times (1 - FLOAD)) \quad (2).$$

Block 128A provide FQHOST to block 134. In this case, block 134 determines IVC based on the input value of FQHOST.

While the present invention has been particularly described, in conjunction with preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 11-345374, filed Dec. 3, 1999, the disclosure of which is hereby incorporated by reference in its entirety.

What is claimed is:

1. A method for controlling intake air of an internal combustion engine, the engine having at least one combustion chamber provided with an intake valve together with an intake manifold provided with a throttle valve, wherein the opening and closure timings of the intake valve are adjustable independently from a crankshaft position to control the amount of intake air supplied to the combustion chamber, the method comprising:

damping an operating signal for the intake valve relative to a change in acceleration or deceleration demand on the engine, for unthrottled intake air control.

2. The method according to claim 1, wherein the operating signal is for timing the opening and closing of the intake valve.

3. The method according to claim 1, wherein the operating signal is for regulating the air intake into the combustion chamber.

4. A system for controlling intake air of an internal combustion engine, the engine having at least one combustion chamber provided with an intake valve together with an intake manifold provided with a throttle valve, wherein the opening and closure timings of the intake valve are adjustable independently from a crankshaft position to control the amount of intake air supplied to the combustion chamber, the system comprising:

a control for damping an operating signal for the intake valve relative to a change in acceleration or deceleration demand on the engine, for unthrottled intake air control.

5. A method for controlling intake air of an internal combustion engine, the engine having at least one combustion chamber provided with intake means together with an intake manifold provided with a throttle valve, wherein the opening and closure timings of the intake means are adjustable entirely independently from the crankshaft position to control the amount of intake air supplied to the combustion chamber, the method comprising:

providing a response adjustment to variable valve timing control of the intake means for unthrottled intake air control;

separating a first operation range for unthrottled intake air control from a second operation range for throttled intake air control;

varying valve timing of the intake means with the throttle valve held in the neighborhood of the wide open throttle position to perform throttled intake air control during said first operation range; and varying throttle valve position of the throttle valve with valve timing of the intake means held to provide a valve opening duration in the neighborhood of the minimum valve opening duration.

6. The method as claimed in claim 5, wherein the step of providing the response adjustment comprises:

providing an engine response performance during unthrottled intake air control as much as an engine response performance during throttled intake air control.

7. The method as claimed in claim 5, further comprising:

determining a first operation variable indicative of a target intake air;

determining a second operation variable indicative of a target valve timing based on the first operation variable;

wherein the step of providing the response adjustment comprises:

processing the second operation variable to cause the response adjustment.

8. A system for controlling intake air of an internal combustion engine, the engine having at least one combustion chamber, the system comprising:

at least one intake valve provided for the combustion chamber;

an electromagnetic driver operatively connected to each intake valve for opening said intake valve;

an intake manifold with a throttle valve communicating with each intake valve; and sensors providing operation variables indicative of operator torque request command and engine speed;

a control unit receiving said operation variables to determine a first operation parameter indicative of target intake air based on said operator torque request command and said engine speed, said control unit being operative to make a selection based on said first operation parameter indicative of target intake air between a first operation range for unthrottled intake air control and a second operation range for throttled intake air control, said first and second operation range being separated from each other by a threshold value of target intake air at each of varying values of engine speed, said threshold value increases as engine speed increases, said control unit being operative to vary, with valve opening timing held in the neighborhood of the top dead center, valve closure timing of said intake valve with said throttle valve held in the neighborhood of the wide open throttle position to perform unthrottled intake air control upon selection of said first operation range, and vary throttle valve position of said throttle valve with valve timing of said intake valve held to provide a valve opening duration in the neighborhood of the minimum valve opening duration that is variable with varying engine speed, said control unit being operative to determine a second operation parameter indicative of a target valve closure timing of said intake valve based on said target intake air, said control unit being operative to provide a response adjustment to said second operation parameter indicative of said target closure timing to give a processed second operation parameter, and said control unit being operative to control said electromagnetic driver to cause said intake valve to close at valve closure timing indicated by said processed second operation parameter.

9. A method for controlling of intake air of an internal combustion engine, the engine having at least one combustion chamber provided with an intake valve together with an intake line having variable flow area dimensions, outside of the intake valve, determined by a throttle, wherein the opening and closure timings of the intake valve are adjustable independently from a crankshaft position to control the amount of intake air supplied to the combustion chamber, the method comprising:

determining a first operation variable indicative of target intake air;

determining a second operation variable indicative of a preliminary valve closure timing for unthrottled intake air control based on the first operation variable;

processing the second operation variable to provide a response adjustment to give a processed second operation variable;

varying the valve closure timing of the intake valve to close the intake valve at a valve closure timing indicated by the processed second operation variable, wherein the intake valve is closed in a dampened fashion in response to a change in acceleration or deceleration demand on the engine.

10. A computer readable storage medium having stored therein data representing instructions executable by a computer to implement unthrottled control of intake air of an internal combustion engine, the engine having at least one combustion chamber provided with an intake valve, wherein the opening and closing times of the intake valve are adjustable independently from a crankshaft position to control the amount of intake air supplied to the combustion chamber, the computer readable storage medium comprising:

instructions for determining a first operation variable indicative of target intake air;

instructions for determining a second operation variable indicative of a preliminary valve closure timing for unthrottled intake air control based on the first operation variable;

instructions for processing the second operation variable to provide a response adjustment to give a processed second operation variable;

instructions for varying the valve closure timing of the intake valve to close the intake valve at a valve closure timing indicated by the processed second operation variable, wherein the intake valve is closed in a dampened fashion in response to a change in acceleration or deceleration demand on the engine.

* * * * *